(12) United States Patent
Van Hoff et al.

(10) Patent No.: US 8,643,674 B2
(45) Date of Patent: *Feb. 4, 2014

(54) RENDERING CHANGED PORTIONS OF COMPOSITED IMAGES

(71) Applicants: Arthur Anthonie Van Hoff, Menlo Park, CA (US); Geoffrey W Chatterton, Santa Clara, CA (US)

(72) Inventors: Arthur Anthonie Van Hoff, Menlo Park, CA (US); Geoffrey W Chatterton, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/943,595

(22) Filed: Jul. 16, 2013

(65) Prior Publication Data

US 2013/0300763 A1     Nov. 14, 2013

Related U.S. Application Data

(63) Continuation of application No. 13/181,560, filed on Jul. 13, 2011, now Pat. No. 8,508,551, which is a continuation of application No. 11/733,024, filed on Apr. 9, 2007, now Pat. No. 7,999,830.

(60) Provisional application No. 60/790,391, filed on Apr. 7, 2006.

(51) Int. Cl.
*G09G 5/00*       (2006.01)

(52) U.S. Cl.
USPC ............................ 345/629; 345/506; 345/419

(58) Field of Classification Search
USPC .......... 345/419, 629, 632, 506, 522; 717/159; 715/853, 854
See application file for complete search history.

(56) References Cited

U.S. PATENT DOCUMENTS

| | | | |
|---|---|---|---|
| 5,500,933 A * | 3/1996 | Schnorf | 345/632 |
| 7,999,830 B1 * | 8/2011 | Van Hoff et al. | 345/629 |
| 8,508,551 B1 * | 8/2013 | Van Hoff et al. | 345/629 |
| 2004/0085310 A1 * | 5/2004 | Snuffer | 345/419 |
| 2006/0262125 A1 * | 11/2006 | Beda et al. | 345/506 |
| 2007/0099703 A1 * | 5/2007 | Terebilo | 463/42 |
| 2008/0001968 A1 * | 1/2008 | Krueger | 345/629 |
| 2009/0315902 A1 * | 12/2009 | Beda et al. | 345/522 |

OTHER PUBLICATIONS

Office Action dated Nov. 23, 2010 for U.S. Appl. No. 11/733,024.
Office Action dated Jun. 11, 2010 for U.S. Appl. No. 11/733,024.
Notice of Allowance dated Apr. 15, 2011 for U.S. Appl. No. 11/733,024.

(Continued)

*Primary Examiner* — Chante Harrison
(74) *Attorney, Agent, or Firm* — Kirton McConkie; Brian Tucker (57) ABSTRACT

Rendering graphics on a display of a device. In a portable or wireless device, a list of instructions needed to refresh or generate a frame is first created. The created instructions are then parsed or optimized to remove instructions that result in unnecessary processing instructions. The optimized list is then executed. During generation of a given frame, a view hierarchy is traversed to identify damaged portions of a display. The damaged portions are not copied to the frame. Also, information that has not changed is likewise not usually copied. Damage from the previous frame less damage from the current frame is copied to the appropriate buffer. The instructions are optimized to render only the portion of the frame that is necessary. Portions of the display that are not visible are not traversed in the view hierarchy and are not considered until visible on the display.

20 Claims, 3 Drawing Sheets

(56) References Cited

OTHER PUBLICATIONS

Office Action dated Nov. 10, 2011 for U.S. Appl. No. 13/181,560.

Office Action dated May 17, 2012 for U.S. Appl. No. 13/181,560.

Notice of Allowance dated Jun. 10, 2013 for U.S. Appl. No. 13/181,560.

* cited by examiner

RENDERING CHANGED PORTIONS OF COMPOSITED IMAGES

CROSS-REFERENCE TO RELATED APPLICATIONS

This application is a continuation of U.S. patent application Ser. No. 13/181,560, filed on Jul. 13, 2011, which is a continuation of U.S. patent application Ser. No. 11/733,024, filed on Apr. 9, 2007 and issued as U.S. Pat. No. 7,999,830, which claims priority to U.S. Provisional Patent Application No. 60/790,391 which was filed on Apr. 7, 2006.

BACKGROUND

1. The Field of the Invention

The present invention relates generally to the field of rendering graphics. More particularly, embodiments of the invention relate to rendering changed portions of composited images.

2. The Relevant Technology

Advances in technology have led to a surge in electronic devices. Personal audio players (e.g., mp3 players), personal digital assistants, personal video players, satellite radios, and the like are examples of devices that people use every day. Many of these devices are wireless. As with most devices, the cost of these devices can vary widely and can depend on the various features that may be included with a particular device.

One of the features that most of these devices have in common, however, is a display. The display is often an integral part of the device and can have a substantial impact on user satisfaction. The ability of a device to provide a rich visual experience can often depend on the graphic capabilities of the device. However, the ability to process graphics comes at a cost.

When a graphic system is composited, for example, it is often the case that multiple layers are drawn or painted to the display. The preparation of a given frame often includes multiple steps. For instance, the background is typically created first. Then, images are placed over the background. Finally, text may be included as yet another layer. In each instance, each of these layers is fully drawn independently of the other layers. When animation or transparency is also introduced, and the display must be redrawn multiple times each second, the computational complexity of the graphics operation increases because it becomes necessary to redraw or repaint the display.

There is therefore a tension that exists between the capabilities of a device, including graphical capabilities, and the cost of the device. This is balanced with the desire of a provider to provide a rich graphical experience to the user. Systems and methods are therefore needed that enable a device to present a rich graphical experience at reduced cost.

BRIEF SUMMARY

These and other limitations are overcome by embodiments of the present invention, which include an image rendering system. Embodiments of the invention enhance the graphical capabilities of a device and provide additional power by reducing the work performed by a graphic engine. For example, the number of distinct steps or commands in a task list designed to render a final image can be reduced or minimized by eliminating or altering some of the instructions that are rendered moot. For example, instructions in a command list that create data that is overwritten by later instructions can be eliminated from the command list. The command list of instructions is parsed to delete, simplify or otherwise alter existing instructions, while conventional image rendering systems generate more commands than are strictly necessary and do not optimize the resulting commands.

In one embodiment, rendering an image on a display of a device often begins by creating a list of instructions. The list of instructions is then optimized by removing instructions that are rendered moot. For instance, a later instruction in the command list may obliterate or overwrite what was written by an earlier instruction. The earlier instruction can therefore be deleted. After the list of instructions is optimized, the list of instructions is executed.

In another embodiment, a graphics display uses a double or otherwise multiply-buffered system and first presents a frame stored in one of the buffers. When the animation is advanced, a revised command list is generated reflecting the next image in the sequence. The modified areas in this new frame are identified as being damaged relative to the previous frame. Any necessary or common portions, excluding the damaged areas, are then copied to the other buffer and the frame is repaired. The repair includes redrawing the damaged area using only the commands and partial commands that apply within the damaged areas. In this example, only the damaged areas need to be redrawn because the information already present in the buffer was valid or had been copied over from the other buffer. These non-damaged areas are valid precisely because they represent the common end state of the same effective sequence of commands being processed for both frames.

Embodiments of the invention can be implemented in a device such as a personal digital assistant, a personal audio/video device, a satellite radio, and the like. By reducing the instructions that have to be performed and by optimizing the traversal of the view hierarchy needed to identify the damaged areas, the device can effectively extend its graphics processing power.

These and other advantages and features of the present invention will become more fully apparent from the following description and appended claims, or may be learned by the practice of the invention as set forth hereinafter.

BRIEF DESCRIPTION OF THE DRAWINGS

In To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments of the invention relate to systems and methods for rendering composited images on the display of a device. Embodiments of the invention can improve the graphical capability of a device without additional hardware or the associated cost of the hardware. When rendering images for presentation on a display, a list of instructions is first analyzed to determine whether all of the instructions are necessary. Instructions that are for naught can be removed without impacting the end result.

Also, the ability of embodiments of the invention to collect damage to a frame as a next frame is being prepared can be improved by limiting damage collection to a visible portion of a display. Also, an image buffering system is managed in such a way that the amount of data in a frame that needs to be processed is minimized. In one embodiment, a graphic engine is required to redraw or paint only the portion of a frame that is marked as damaged (e.g., the portion of the frame that has been modified).

Thus, embodiments of the invention improve the graphics capability of a device by optimizing the instruction list and by intelligently preparing the frames that are painted to the display.

In the following description, numerous specific details are set forth in order to provide a thorough understanding of the present invention. It will be obvious, however, to one skilled in the art that the present invention may be practiced without these specific details. In other instances, well-known aspects of media player and computing devices have not been described in particular detail in order to avoid unnecessarily obscuring the present invention.

Figure 1:
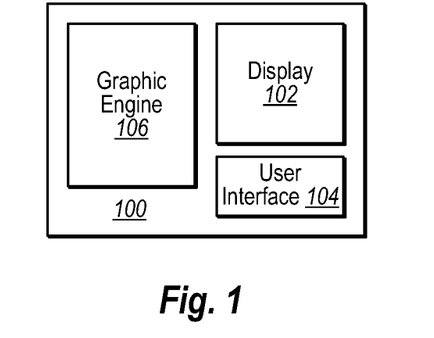
FIG. 1 illustrates an example device for implementing embodiments of the invention.

FIG. 1 illustrates one embodiment of a device 100. The device 100 includes a display 102 and a user interface 104. The display 102 is used to display images to a user and the user interface 104 enables a user to interact with the device 100. The images displayed on the display 102 can be stored on memory of the device or received over a network and then displayed on the display 102.

The user interface 104 may include buttons, capacitive devices, scroll wheels, a keypad, and the like or any combination thereof. The display 102 may support touch screen capabilities as well that enable the user to provide input to the device 100. The device 100 is representative of devices that include, but are not limited to, satellite radios, personal audio/video devices, personal digital assistants, and the like or any combination thereof.

The device 100 also includes a graphic engine 106. The graphic engine 106 is responsible for painting the display 102. The process of painting or drawing the display 102 is a repetitive process that occurs multiple times each second. In one embodiment, the process of drawing the screen typically begins with a set of instructions or commands. These instructions, for example, typically direct the process that composites an image. For example, a background may be drawn first. The background is then followed by successive layers of other images or text until the process is complete. The completed display is then drawn on the device's display.

Embodiments of the invention optimize this process by reducing the number of instructions that are required to draw or render a display. The list of instructions or commands is optimized to remove instructions that are redundant. By reducing the number of instructions, the time needed to prepare a given frame is reduced. This enables devices or graphic engines such as the engine 106 to more easily prepare the various frames.

Figure 2:
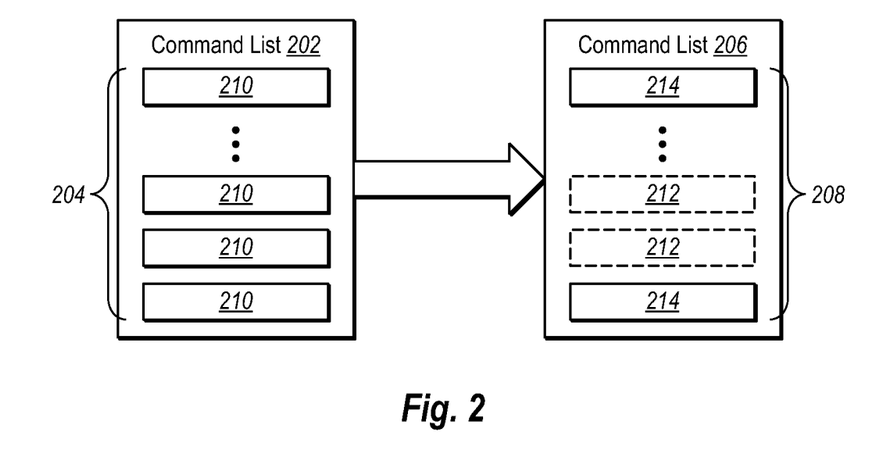
FIG. 2 illustrates a command list that is optimized for rendering graphics in a device.

FIG. 2 for example illustrates an example of this process. The command list 202 illustrates the instructions 204 that are conventionally required to successfully prepare a frame that is then drawn or painted to a display. The command list 206 represents the optimized instructions 208 that result in the same result. In the optimized instructions 208, however, the instructions 212 have been removed and are not executed by the graphic engine of the device. In essence the instructions 204 are parsed to generate the optimized instructions 208, thereby minimizing the work performed by the graphic engine and, at the same time, effectively increasing the power of the graphic engine.

For example, as an image is composited, some of the later layers obliterate portions of the previous layers. In this case, the instructions that create or draw the portions of the previous layers that are obliterated can be removed from the command list. In some instances, the instructions, rather than being removed, are altered.

For example, consider the following sequence of instructions:

(1) Fill rectangle (100, 100, 10×10)
(2) Blend image at same location
(3) Obliterate image (100, 100, 10×10)
(4) . . .
(5) Obliterate (100, 100, 10×5)

If only the first three instructions are considered, the first instruction (1) fills an area of the display. The second instruction (2) blends an image at the same location. The third instruction (3) however obliterates the area that is drawn by instructions (1) and (2). The later instruction (3) thus renders the execution of the instructions (1) and (2) moot. The optimization of these instructions therefore results in the elimination of instructions (1) and (2) because the work performed by these instructions is overwritten or not needed.

When the fourth and fifth instructions are considered, the optimization of the instructions may be different. For example, the instruction (5) obliterates a part of the area that is obliterated by the instruction (3). Thus, the instruction (3) can be optimized to only obliterate the portion of the image that is not later obliterated by the instruction (5). Also, instructions (1) and (2) can still be removed in this case.

The command list 202 is thus a list of instructions that, when executed, render an image. More specifically, the command list 202 generates a frame in a frame buffer that is then displayed. The command list 206 is an optimization of the command list 202 and reduces the number of instructions executed by the graphic engine without changing the ultimate result. The command list 206 of optimized instructions is a minimal set of instructions needed to composite a screen or a portion of a screen. By optimizing the command list, unnecessary instructions are avoided.

Figure 3A:
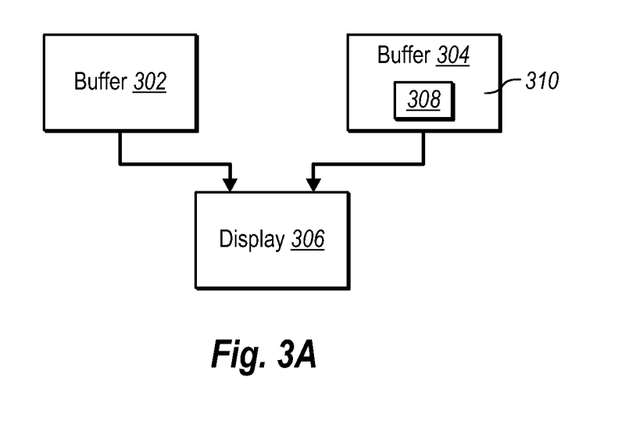
FIG. 3A illustrates a double buffer used in rendering graphics on a display of a device.
Figure 3B:
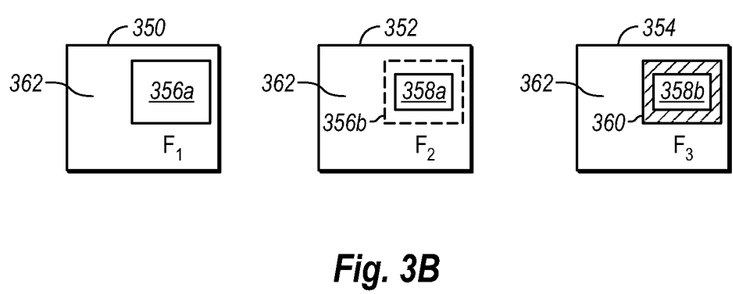
FIG. 3B illustrates areas that are copied from one frame to the next in an example embodiment of the invention.
Figure 4:
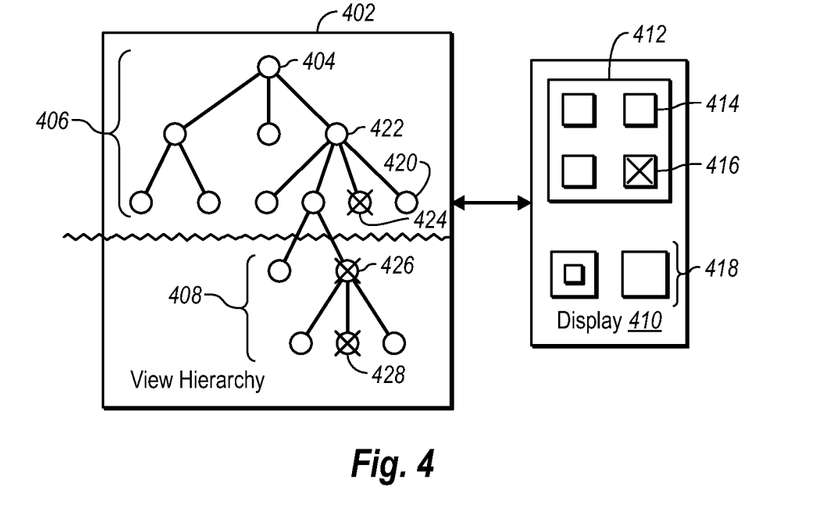
FIG. 4 illustrates a view hierarchy of a display of a device.

FIGS. 3A, 3B and 4 illustrate one embodiment of a method for rendering a display. The example of a graphic engine illustrated in FIG. 3A uses a double buffering system. However, one skilled in the art will appreciate that embodiments of the invention can also be implemented in graphic engines having single-buffered architectures as well as in graphic engines having three or more buffers. The buffer 302 and the buffer 304 are used to store successive frames that are painted to the display. Once the frame in a buffer 302 is painted, the display pointer is switched to the other buffer 304 and the frame in the buffer 304 is painted to the display 306. Meanwhile, the next frame is being prepared in the buffer 302 and so on.

In many instances, only part of the frame is copied. For example, in a series of frames, the area that changes from one frame to the next may be less than the entire frame. As a result, there may be portions of the display that do not change over a larger number of frames. Embodiments of the invention therefore do not need to copy this part of the frame.

This aspect is further illustrated in FIG. 3B, which illustrates a series of three frames 350, 352, and 354. In the frame 350, the area 356a represents the area that is damaged and that is repaired in the frame 352. Thus, the area 356b in the frame 352 has been repainted and the area 358a experienced damage in the frame 352. Presumably, the other areas of the frames 350 and 352 are already identical and do not need to be copied from one frame to the next. However, there is a need to copy some data from the frame 352 to the frame 354. The data copied from frame 352 to frame 354 is represented by the cross hatched area 360 (note that the data in area 362 is already present in the buffers in most instances). This can be determined by the damage to the frame 350 less the damage to the frame 352 (generally represented by $(F_{(i-1)}-F_{(i)}))$). The area 358a is not copied into the area 358b because it is damaged in the frame 352 and is redrawn. In this manner, the amount of data copied from one frame to the next is optimized.

In some embodiments of the invention, the graphic engine may have three or more buffers. Accordingly, each of the three frames 350, 352, 354 can be stored in a separate buffer. For instance, the frame 350 can be stored in a first buffer, the frame 352 can be stored in a second buffer and the frame 354 can be stored in a third buffer. In this case, generating frame 354 in the third buffer can include copying data solely from the second buffer (as well as repairing any damaged area). Alternately, data from both the first and second buffer can be used to generate frame 354 in the third buffer.

Generally speaking then, where the graphic engine has a plurality of buffers, a subsequent frame in a subsequent buffer can be generated by copying data from any number of the previous frames stored in the previous buffers. This includes copying data from two or more previous frames where one of the previous frames immediately precedes the subsequent frame, as described in the previous paragraph, as well as copying data from one or more previous frames that do not immediately precede the subsequent frame. For example, in a three-buffer situation using a single-frame blink effect, a first frame stored in a first buffer will be the same as a third frame stored in a third buffer. Rather than marking a blink area in a second frame stored in a second buffer as damaged and then copying and repairing it to generate the third frame, the data from the first frame can be copied to the third frame without any repairs.

Returning to FIG. 3A, the preparation of the next frame in the buffer 302 may include painting areas that have changed compared to the frame in the buffer 304. For example, the area 308 represents the part of the frame in the buffer 304 that changes or that has been animated. The change that occurs in a given frame is referred to herein as damage. While conventional systems typically operate by processing the entire buffer for each frame, embodiments of the invention focus on the damage that occurs from one frame to the next. The preparation of the frame 302 may include copying the unchanged portion 310 of the buffer 304 into the buffer 302. The area 308 is not copied because it is damaged and will be repainted as the frame in the buffer 302 is prepared. Further, embodiments of the invention also focus on the damage that is visible to the user. As described below, this can reduce processing requirements and save processing power. The area 304 is not necessarily rectangular in shape, but is dependent on the animation made to the frame in the buffer 304. Often, the area 304 is represented by multiple rectangles.

Embodiments of the invention identify the parts or areas of a frame that are damaged, copy the relevant parts of a frame to another buffer, create the command list of instructions needed to fix the damage, optimize the command list of instructions, and then paint the screen. In this example, the area 308 changes and is therefore damaged. The area 308 is the portion of the frame that is repaired in the buffer 302 for the next frame. The damage is usually marked with a frame number or other designation such that the graphic engine can identify whether the damage is relevant for the generation of the next frame.

The collection of damage to a given frame is typically achieved using a tree structure or a view hierarchy that represents the display of a device or represents what can potentially be displayed on a device. FIG. 4 illustrates a display 410 and a view hierarchy 402 associated with the display 410. In this example, the view hierarchy 402 is a structure that represents items on or specific areas of the display 410. More particularly, the various nodes in the view hierarchy 402 represent specific portions of a frame. The nodes correspond to items in or areas of the display 410. In addition, the nodes 406 represent areas that are currently visible to the user and the nodes 408 represent areas that are not visible to the user. Because a view hierarchy 402 can be quite deep and complex, identifying which nodes are currently visible can optimize the process of rendering the display by only requiring that damage be collected from visible nodes.

In this example, the node 404 is a top level node and represents the entire display 410. The node 422, on the other hand, may correspond with the image or graphic in the area 412. The node 422 also has children nodes including the node 420 and the node 424. The "x" in the node 424 represents that the corresponding area in the display 410 has been damage as represented by the "x" in the image in the area 416. This node represents that part of the frame that is to be updated for the next frame.

Each node in the view hierarchy 402 can also track frame generation. This enables the graphic engine to determine when the damage occurred relevant to the current frame being painted. For example, the damage in the node 424 may be associated with frame F. More specifically, either the node itself or the node's parent can be marked. If the generation of a frame in a given node is $F_1$ and is marked, then this indicates that something changed after $F_1$ was drawn. This part of the view hierarchy was changed. In a multiply-buffered system, the accumulated generational damage and changes (i.e., the final rendering of frame $F_1$) can be easily correlated to a specific buffer and used as source material for a future frame (i.e., for frame $F_2$) wherever an appropriately congruent view hierarchy state exists.

In other words, the parent and/or child node in the view hierarchy is marked as having changed in a given generation of frame. When the visible portion of the view hierarchy is traversed, the damage can be quickly collected. When an update is made to the display (i.e., from $F_1$ to $F_2$), the visible portion of the view hierarchy is traversed and the damage is collected. Advantageously, less than all of the view hierarchy is traversed.

Because the nodes 426 and 428 are not visible and have not been traversed for some time, the damage to areas that correspond to the nodes 426 and 428 may correspond to the Frame $F_{(i-12)}$. Should these areas represented by the nodes 426 and 428 again become visible, it is likely that more than just damage areas will be repainted because of their age with respect to the current frame. In other words, the damage may be discarded in this case.

Because there are some areas or potential areas of the display that are not visible to the user at a given point of time, embodiments of the invention do not typically traverse the entire view hierarchy 402 each time a new frame is generated. Rather, embodiments of the invention traverse the view hierarchy 402 in order to collect the damage (such as the image represented by the node 424) that are in areas of the display visible to the user. Thus, embodiments of the invention do not traverse the entire view hierarchy (which can be quite complex and have multiple levels), but only traverse the visible portion of the view hierarchy to collect relevant damage.

In this example, the nodes 408 are not visible and are therefore not traversed while collecting damaged areas of the frame. The nodes 406, on the other hand, are visible and damage is therefore collected from these nodes during the generation of a given frame. Damage can occur, by way of example, when the frame is animated. In order to draw the next frame, it is only necessary to update those portions of the frame that are affected by the animation or are otherwise damaged.

Figure 5:
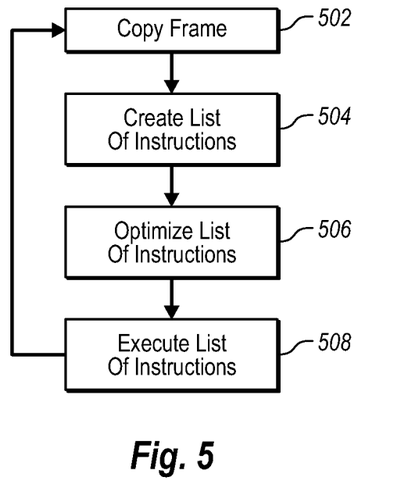
FIG. 5 presents an example method for rendering graphics on a display of a device.

FIG. 5 presents an exemplary method for rendering a display. When a frame is being prepared for a buffer, the next frame to be displayed is copied 502 from the current frame being displayed. As described above, this may require traversing a view hierarchy to identify damaged areas of the current frame. Copying 502 the current frame is typically performed by copying only those portions of the current frame that do not change. This saves processing time by not copying damaged areas, which are going to be repainted.

After the frame is copied into the buffer, a list of instructions 504 is created. Creating 504 the list of instructions can depend on input from the user as well as what is going to be displayed next. Typically, the created list of instructions is designed to only paint the area that needs painting. In other words, the area of the frame that was not copied (the damaged area) from the other frame is the area that is painted by the list of instructions. In the case where the next frame includes portions of the view hierarchy that have not been visible for several frames, the damage is discarded and the list of instructions includes instructions to paint the entire portion of the display that was not visible. Alternatively, an analysis of these areas is performed to determine whether the damaged areas are still relevant.

After creating 504 the list of instructions, the list of instructions is optimized 506. As described previously, this can include removing instructions that are redundant or in altering instructions. In some instances, this ensures that various areas of the frame are not repeatedly generated as the frame is generated. After optimizing 506 the list of instructions, the list of instructions is executed 508. This results in a frame in the buffer than can then be painted on the display of the device. The process then repeats using the other buffer. One advantage of using dual buffers is that flicker is eliminated and a user is unable to see the screen being drawn as the damaged areas are rendered. Triple buffers and other multiply-buffered systems can also be implemented.

Figure 6:
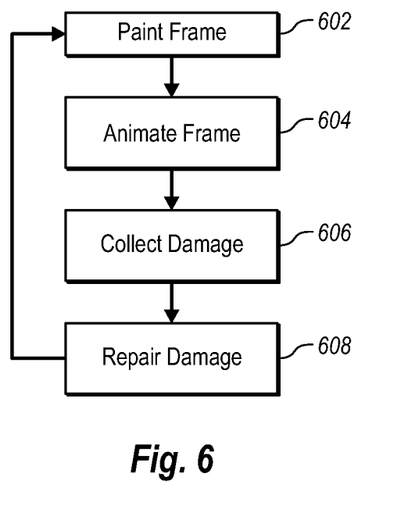
FIG. 6 illustrates another embodiment of a method for painting a display of a device.

FIG. 6 illustrates a similar process for painting a display. The method illustrated in FIG. 6 begins by painting 602 a frame on a display of a device. After the frame is painted, the display is animated 604, which results in damage to some areas of the display. As noted above, the damage is reflected in the view hierarchy. In preparation for the next frame, the view hierarchy is traversed and damage is collected 606. This enables the graphic engine to identify those areas of the frame that have experienced damage, owing by way of example only, to animation, change in menu selection, and the like.

After the damage is collected, the damage is repaired 608. Repairing the damage can include copying the previous frame less the damaged areas. Copying the frame can occur at any appropriate time in the process as along as the buffer is ready to receive the copied data. After copying the data, as described with reference to FIG. 3B in one embodiment, an instruction list is created, optimized, and executed for the areas that are needed to complete the frame. Once completed, the frame pointer is switched and the newly finished frame is displayed as another buffer is then used to create the next frame.

Embodiments of the invention may therefore comprise a graphic engine including an image module for managing a plurality of buffers that are used in a round robin fashion to generate successive frames painted in a display. In other words, the plurality of buffers are used sequentially or in series and upon reaching the last buffer, the process begins anew at the first buffer. Generally, successive frames in the plurality of buffers are generated by repairing only portions of the image that are damaged from one frame to another. The image module can repair portions of the image that are damaged by creating a list of instructions, optimizing the list of instructions and executing the optimized list of instructions. In some embodiments, the image module does not copy damaged portions from a previous buffer to a subsequent buffer when generating a frame in the subsequent buffer, instead generating the list of instructions to draw the damaged portions. As will be apparent to one skilled in the art, the copy operations described herein may be performed between two or more buffers to minimize the damaged portions that must be redrawn.

In one embodiment, the image module can identify the portions of the image that are damaged by traversing at least a visible section of a view hierarchy, wherein the view hierarchy corresponds to images included in or potentially included in the display. The image module does not traverse images potentially included in the display. In some embodiments, the image module discards damage collected in the view hierarchy when the collected damage is above a threshold number of frames old.

Embodiments of the media device may include computer-readable media for carrying or having computer-executable instructions or data structures stored thereon. Such computer-readable media can be any available media that can be accessed by a portable device or general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a portable device or general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, the invention may be described in the general context of computer-executable instructions, such as program modules, being executed by computers in network environments. Generally, program modules include acts, routines, programs, objects, components, data structures, etc., that perform particular tasks or implement particular abstract data types. Computer-executable instructions, associated data structures, and program modules represent examples of the program code means for executing acts of the methods disclosed herein. The particular sequence of such executable instructions or associated data structures represents examples of corresponding acts for implementing the functions described in such acts.

The devices may also include a magnetic hard disk drive for reading from and writing to a magnetic hard disk, a magnetic disk drive for reading from or writing to a removable magnetic disk, or an optical disk drive for reading from or writing to removable optical disk such as a CD-ROM or other optical media. The drives and their associated computer-readable media provide nonvolatile storage of computer-executable instructions, data structures, program modules and other data. Although the exemplary environment described herein may employ a magnetic hard disk, a removable magnetic disk and/or a removable optical disk, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk, magnetic disk, optical disk, ROM or RAM, including an operating system, one or more application programs, other program modules, and program data. A user may enter commands and information through a keyboard, pointing device, or other input devices (not shown), such as a microphone, joy stick, touch pad, game pad, satellite dish, scanner, or the like. These and other input devices are often connected to the processing unit through a universal serial bus (USB) or serial port interface coupled to system bus. Alternatively, the input devices may be connected by other interfaces, such as a parallel port, or a game port. A display device is also connected to system bus via an interface, such as video adapter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, performed by a computer system comprising one or more processors, for minimizing the processing required for rendering frames of an image on a display of a device, the method comprising:
   accessing, by the computer system, a view hierarchy comprised of a plurality of hierarchically arranged nodes, each node defining a portion of content from which frames can be generated for display on the device;
   traversing, by the computer system, the view hierarchy to render a subsequent frame by:
   (1) identifying a first set of nodes in the view hierarchy that define a portion of content in a previous frame that will remain unchanged in a subsequent frame, and copying the unchanged portions from the previous frame to a buffer in which the subsequent frame is being composited; and
   (2) identifying a second set of nodes in the view hierarchy that define a portion of content in a previous frame that will be changed in the subsequent frame, and generating a list of instructions using the second set of nodes that, when executed, will generate the changed portions in the subsequent frame;
   determining, by the computer system, that at least one of the instructions in the list of instructions is at least partially redundant to at least one other instruction in the list of instructions;
   prior to executing the list of instructions, optimizing, by the computer system, the list of instructions by removing at least one instruction that is at least partially redundant;
   executing, by the computer system, the optimized list of instructions to generate the changed portions of the subsequent frame in the buffer; and
   accessing, by the computer system, the buffer to output the subsequent frame for display on the device.

2. The method of claim 1, wherein traversing the view hierarchy further comprises:
   identifying a third set of nodes that define a portion of content that will not be visible in the subsequent frame; and
   bypassing the processing of the third set of nodes while rendering the subsequent frame.

3. The method of claim 1, wherein optimizing the list of instructions further comprises altering at least one instruction.

4. The method of claim 1, wherein copying the unchanged portions from the previous frame comprises copying the unchanged portions from a second buffer in which the previous frame is stored.

5. The method of claim 1, wherein copying the unchanged portions from the previous frame comprises copying the unchanged portions from one or more other buffers in which the unchanged portions are stored.

6. The method of claim 1, wherein identifying the second set of nodes comprises identifying that a frame number is associated with each node in the second set of nodes.

7. The method of claim 6, wherein the frame number defines the last frame prior to the changed portions being changed.

8. The method of claim 1, wherein the previous frame is displayed immediately prior to the subsequent frame.

9. The method of claim 1, wherein one or more other frames are displayed between the previous frame and the subsequent frame.

10. One or more non-transitory computer storage media storing computer executable instructions which when executed by one or more processors of a computer system perform a method for minimizing the processing required for rendering frames of an image on a display of a device, the method comprising:
   accessing a view hierarchy comprised of a plurality of hierarchically arranged nodes, each node defining a portion of content from which frames can be generated for display on the device;
   traversing the view hierarchy to render a subsequent frame by:
   (1) identifying a first set of nodes in the view hierarchy that define a portion of content in a previous frame that will remain unchanged in a subsequent frame, and copying the unchanged portions from the previous frame to a buffer in which the subsequent frame is being composited; and
   (2) identifying a second set of nodes in the view hierarchy that define a portion of content in a previous frame that will be changed in the subsequent frame, and generating a list of instructions using the second set of nodes that, when executed, will generate the changed portions in the subsequent frame;
   determining that at least one of the instructions in the list of instructions is at least partially redundant to at least one other instruction in the list of instructions;
   prior to executing the list of instructions, optimizing the list of instructions by removing at least one instruction that is at least partially redundant;

executing the optimized list of instructions to generate the changed portions of the subsequent frame in the buffer; and accessing the buffer to output the subsequent frame for display on the device.

11. The computer storage media of claim 10, wherein traversing the view hierarchy further comprises:
identifying a third set of nodes that define a portion of content that will not be visible in the subsequent frame; and
bypassing the processing of the third set of nodes while rendering the subsequent frame.

12. The computer storage media of claim 10, wherein optimizing the list of instructions further comprises altering at least one instruction.

13. The computer storage media of claim 10, wherein copying the unchanged portions from the previous frame comprises copying the unchanged portions from a second buffer in which the previous frame is stored.

14. The computer storage media of claim 10, wherein copying the unchanged portions from the previous frame comprises copying the unchanged portions from one or more other buffers in which the unchanged portions are stored.

15. The computer storage media of claim 10, wherein identifying the second set of nodes comprises identifying that a frame number is associated with each node in the second set of nodes.

16. The computer storage media of claim 15, wherein the frame number defines the last frame prior to the changed portions being changed.

17. The computer storage media of claim 10, wherein the previous frame is displayed immediately prior to the subsequent frame.

18. The computer storage media of claim 10, wherein one or more other frames are displayed between the previous frame and the subsequent frame.

19. A computing device comprising:
one or more processors; and
memory storing computer executable instructions which when executed perform a method for minimizing the processing required for rendering frames of an image on the computing device, the method comprising:
accessing a view hierarchy comprised of a plurality of hierarchically arranged nodes, each node defining a portion of content from which frames can be generated for display on the device;
traversing the view hierarchy to render a subsequent frame by:
(1) identifying a first set of nodes in the view hierarchy that define a portion of content in a previous frame that will remain unchanged in a subsequent frame, and copying the unchanged portions from the previous frame to a buffer in which the subsequent frame is being composited; and
(2) identifying a second set of nodes in the view hierarchy that define a portion of content in a previous frame that will be changed in the subsequent frame, and generating a list of instructions using the second set of nodes that, when executed, will generate the changed portions in the subsequent frame;
determining that at least one of the instructions in the list of instructions is at least partially redundant to at least one other instruction in the list of instructions;
prior to executing the list of instructions, optimizing the list of instructions by removing at least one instruction that is at least partially redundant;
executing the optimized list of instructions to generate the changed portions of the subsequent frame in the buffer; and
accessing the buffer to output the subsequent frame for display on the device.

20. The computing device of claim 19, wherein copying the unchanged portions from the previous frame comprises copying the unchanged portions from a second buffer in which the previous frame is stored.

* * * * *